Patented Oct. 11, 1938

2,132,809

UNITED STATES PATENT OFFICE 2,132,809

OXIDATION PRODUCTS OF RUBBER

Henry Potter Stevens and Frederick James William Popham, London Bridge, England, assignors, by mesne assignments, to The British Rubber Producers' Research Association, London, England No Drawing. Application May 20, 1936, Serial No. 80,909. In Great Britain December 24, 1935

8 Claims. (Cl. 18—50)

This invention relates to oxidation products of rubber.

Rubber may be oxidized in solution by air oxygen and the like in the presence of catalysts and this process may be further improved by carrying out the oxidation under pressure. In the preparation of a solution of rubber with catalyst it is often convenient to mill the catalyst into the rubber and to dissolve the mixture in white spirit or other solvent previous to aeration.

In the above processes a solvent is necessary, generally in excess of subsequent requirements so that part or the whole of it must be subsequently removed, generally by distillation, and the further oxidation in the presence of a solvent takes some time.

It has now been found that the process may be still further improved both in so far as it relates to the preparation of products of or from rubber for example resins, which may involve depolymerization and other chemical or physical changes in the rubber, and to the preparation of products suitable for moulding powders with or without admixture of thermosetting resins of known type; e. g. the condensation products of formaldehyde with phenols, or thiourea, urea, glycerol with phthalic anhydride and the like.

Thus it has been found that if a catalyst be incorporated in the rubber by milling, hereinafter referred to as "catalyzed rubber" and the mixture be suitably spread or dispersed so as to expose a large surface to the air the oxidation is very rapid and a solvent is not required.

As an illustration of a method of carrying out the invention the catalyzed rubber is milled or mixed with a large quantity of dry porous cellulosic material or filler as for example wood flour. Considerable oxidation occurs during the process of incorporating the filler and the operation may, if necessary, be completed by heating for a short time at a raised temperature such as 80° C. either on the rolls, in a mixer, or in an oven or by any other convenient means of heating in the presence of air or oxygen.

As an example the following ingredients may be taken:—

| | Parts |
|---|---|
| Crepe rubber milled with 2½% cobalt linoleate | 30 |
| Dried wood flour (120 mesh) | 70 |

The rubber is first well milled and the cobalt linoleate thoroughly incorporated in the milled rubber. It is then suitably disposed on rolls set to give a milling action and the wood flour is added until a homogeneous sheet is produced. With the above proportions, the material tends to flake off the rolls but soon acquires a pastry consistency if further rolled for five minutes. At this stage a conversion of at least 85% of the rubber to oxidized products as measured by the acetone soluble content is obtained. On further heating for fifteen minutes at a temperature of 70° C. the product becomes dry and hard and can be ground to a powder.

The nature of the resinous product may be varied by adjusting the proportion of wood flour used.

It should be noted that as oxidation proceeds the nature and solubility of the products change. The less oxidized material is soluble in white spirit but insoluble in alcohol and acetone. As oxidation proceeds it becomes soluble in acetone while retaining its solubility in white spirit although the still further oxidized product no longer dissolves in white spirit, but is soluble in both acetone and alcohol. These products are hereafter designated resins A, B and C respectively.

The reaction is best carried out at a temperature of between 80 and 85° C., and it should be noted that an exothermic reaction is set up which may be controlled by cooling the rolls of the mill or mixing machine if necessary. Variations in temperature between certain limits do not have as much effect on the nature of the product as the proportion of filler used, but they do effect the rate of conversion and the efficiency of the catalyst. The reaction begins to slow down at a temperature of 75° C. and the catalyst is slowly inactivated at temperatures above 90° C., the inactivation proceeding more rapidly as the temperature is increased. Moreover, at higher temperatures the exothermic reaction above referred to may cause ignition of the product.

Variations in the kind of resin produced are best obtained by varying the proportion of wood flour and keeping the temperature and time of milling constant. As examples the following may be cited:—

Example 1

| | Parts |
|---|---|
| Catalyzed rubber | 100 |
| Dried wood flour (100 mesh) | 100 |

Milled for 30 minutes at 80–85° C.

Resin content of mixture equals 95% of original rubber and contains:—

| | |
|---|---|
| A resin | 95% |
| B resin | 5% |
| C resin | nil |

Example 2

| | Parts |
|---|---|
| Catalyzed rubber | 100 |
| Dried wood flour (100 mesh) | 200 |

Milled for 30 minutes at 80–85° C.

Resin content of mixture equals 100% of original rubber.

| | Per cent |
|---|---|
| A resin | 25 |
| B resin | 40 |
| C resin | 30 |

Example 3

| | Parts |
|---|---|
| Catalyzed rubber | 100 |
| Dried wood flour (100 mesh) | 230 |

Milled for 30 minutes at 80–85° C.

Resin content of mixture equals 107% of original.

| | |
|---|---|
| A resin | nil |
| B resin | 10% |
| C resin | 90% |

It will be noted that whilst examples are given which indicate a yield of practically all resin A or all resin C no example is given in which resin B preponderates. It has not been found practicable to produce a product consisting of all resin B. This resin may, however, be isolated if required by fractional extraction of the product with suitable solvents. For example, the C resin is first extracted with alcohol and the B resin then extracted with acetone.

The process is not restricted to milling on rolls, but any other form of mixing plant may be used. For instance, the wood flour may be incorporated into the catalyzed rubber on the ordinary milling rolls until the depolymerizing action has taken place. The material may then be transferred to any form of disintegrator or mixer maintained at a suitable temperature and to which free access of air can be obtained.

The powders so obtained can be utilized for the formation of moulding powders either alone or mixed with other thermo-setting powders or alternatively they may be extracted with a suitable solvent for the separation of the oxidized rubber for utilization, for the formation of moulding powders and for other uses, e. g. for the formation of varnishes and the like. Fillers other than wood flour such as silica flour, kieselguhr and asbestos may be used but are less efficient than wood flour.

The amount or degree of the previous milling of the rubber before the catalyst is added has a marked effect on the rapidity of oxidation and/or depolymerization when the product is subsequently milled with the filler with or without subsequent exposure to air. It appears that the longer or more intense the preliminary milling the higher the degree of oxidation and/or depolymerization as shown for instance by a larger proportion of the rubber converted to an acetone soluble product.

The ingredients may for example be mixed in a Banbury or other type of internal mixer. The accelerating effect of the temperature may be obtained by milling or mixing on hot rolls or in a heated mixer and the time may be regulated according to the nature of the product required.

The nature of the product seems to vary with the proportion of oxygen absorbed and is characterized by its solubility in white spirit, acetone, or alcohol. Where a product is desired of the type corresponding to resin A and soluble in white spirit and insoluble in acetone, oxidation will be found to have proceeded sufficiently for the purpose by the time the wood flour has been incorporated.

For the formation of a resin suitable for an insulating varnish a further short heat treatment may be necessary.

By continued treatment a resin soluble in acetone and alcohol and suitable as such for incorporation with other alcohol soluble synthetic resins or with cellulose lacquers and the like can be obtained.

The invention is not restricted to the use of the milling operation, nor to any particular type or variety of rubber, or fillers. Any suitable catalyst, that is one promoting the oxidation and/or depolymerization of the rubber may be employed, and it is possible to proceed without the use of a catalyst if the natural deoxidant in the rubber be first removed as by acetone extraction.

The product obtained from Example 3 can be heated for four hours at 100° C. when a further change takes place. A portion of the powder so treated, placed in a mould and heated at 160° C. under a pressure of 1½ tons per square inch for a period equivalent to 27½ seconds per m. m. thickness of moulding in this case six minutes for a thickness of 13 m. m. The resulting product is a hard, tough, coherent mass suitable for use as an insulating material.

Previous to heating under pressure, the powder may be mixed with other ingredients including commercial moulding powders.

The present invention therefore comprehends:
1. Processes for the rapid oxidation and/or depolymerization of catalyzed rubber by dispersing it over a large surface exposed to oxygen or air by the use of a suitable powdered or porous cellulosic material, e. g. wood flour, to give the required surface.
2. The production of oxidized and/or depolymerized products from rubber deposited on the surface of a powder or throughout the mass of a porous product, in such a manner as to expose a large surface of the material to oxygen or air.
3. The production of oxidized and/or depolymerized products of rubber without the use of a solvent followed by extraction, it may be with a solvent, to isolate the oxidized products or to form varnishes.
4. The production of moulding powders simultaneously with the formation of thermo-setting resins from oxidized and/or depolymerized rubber.

By the present invention commercially useful products of rubber are readily obtained.

What we claim is:—
1. A process for the preparation of rubber derivatives more especially resins consisting in dispersing rubber over a cellulosic material having a large surface and exposing the dispersed rubber mixture dry to oxygen or air at a temperature below 100° C.
2. A process for the preparation of rubber derivatives more especially resins from rubber consisting in adding a catalyst to the rubber and dry mixing the catalyzed rubber with a porous cellulosic material thereby providing a large sur- face for the exposure of the rubber and working the mixture in oxygen or air.

3. A process for the preparation of rubber derivatives according to claim 2 wherein the porous cellulosic material is wood flour.

4. A process for the preparation of rubber derivatives according to claim 2 wherein the dry mixing is effected without the use of a solvent, and the rubber derivatives are subsequently extracted by means of a solvent.

5. A process for the preparation of rubber derivatives according to claim 2 wherein means are provided for preventing excessive rise in temperature during the working of the mixture in oxygen or air.

6. A process for the preparation of rubber derivatives according to claim 2 wherein the cellulosic material is wood flour in a quantity in the mixture not less than the quantity of the catalyzed rubber and the working of the mixture is carried out at a temperature between 75° and 85° C.

7. A process for the preparation of rubber derivatives according to claim 2 wherein the different rubber derivatives are subsequently segregated by extraction from the worked mixture with different solvents such as white spirit, acetone, and alcohol.

8. A process for the preparation of rubber derivatives according to claim 2 wherein the catalyst is cobalt linoleate.

HENRY POTTER STEVENS.
FREDERICK JAMES WILLIAM POPHAM.